Patented Nov. 12, 1940

2,220,894

UNITED STATES PATENT OFFICE 2,220,894

LUMINOUS MATERIAL AND INTENSIFYING SCREEN FOR X-RAYS AND A METHOD FOR MANUFACTURING THE SAME

Josef Einig, Berlin-Friedrichshagen, Germany, assignor to Sherka Chemical Co. Inc., Bloomfield, N. J., a corporation of New York No Drawing. Application December 8, 1937, Serial No. 178,778. In Germany December 8, 1936

3 Claims. (Cl. 250—81)

This invention relates to improvements in the manufacture of luminous materials and of intensifying screens for X-rays.

Most of the intensifying screens employed at the present time for X-ray photographs contain as luminous material calcium tungstate. Attempts have already been made to replace the calcium tungstate by zinc sulphide which gives blue or violet luminescence. These attempts failed for the reasons that the salt continues in luminescence too long and exhibits the phenomenon of the latent picture, which consists in that the used intensifying screen or renewed irradiation again produces the same picture even after fourteen days without use. According to a known process the after-luminescence was avoided in such a manner that to the salt small quantities (1:500,000 to 1:2,000,000) of cobalt or nickel were added. This process is, however, unsatisfactory since by the addition of cobalt or nickel although the after-luminescence is reduced to an allowable strength, at the same time the valuable immediate luminescence is considerably reduced. The phenomenon of the latent picture on the other hand could not be removed even by such additions.

In accordance with the present invention all these difficulties are removed. According to the invention in the manufacture of zinc or zinc-cadmium sulphide luminous materials as activators silver and manganese are employed simultaneously, suitably in quantities of less than 0.05% calculated on the base material. Advantageously the silver content amounts to a multiple of the manganese content. Good results are, for example, obtained if the proportion of silver to manganese amounts to 6:1 to 10:1.

Luminous materials produced according to this invention are more brightly luminous than calcium tungstate and in addition are better suited for practical application in intensifying screens on account of their greater penetrability by X-rays, so that in the case of a screen thus produced the customary exposure times can be considerably reduced. A zinc sulphide thus produced has a visible after-luminescence but this has no effect on the photographic layer.

In the case of zinc-cadmium sulphide luminous materials having a green luminescence, the after-luminescence otherwise produced to a disturbing degree is in this manner repressed to a far-reaching extent.

The following examples serve to illustrate the invention without, however, limiting the same to them:

Example 1

1000 grams of zinc sulphide of the purity customary for the manufacture of luminous materials are heated with 0.3 gram of silver nitrate and 0.5 gram of crystallised manganous chloride in the presence or absence of fluxes (fluxing salt) at temperatures between 900 and 1200° C. for 10 minutes to 2 hours or longer according as to whether fine or coarse crystalline products are intended to be obtained. The product obtained gives after washing out, a crystalline white powder which, under the influence of X-rays, gives a violet luminescence and yollowish-white after-luminescence. By variation of the quantities of the activators and also their proportion to one another the colour of the emitted light can be influenced to a far-reaching extent as regards displacement towards shorter or longer waves and thus also as regards brightness and after-luminescence. A luminous material thus produced does not exhibit the phenomenon of the latent picture.

Example 2

1000 grams of a mixture of about 200 grams of cadmium sulphide and about 800 grams of zinc sulphide are intimately mixed with 0.2 gram of silver nitrate and 0.02 gram of crystalline manganous chloride and heated as described above. The product obtained exhibits in contradistinction to luminous materials produced without addition of manganese no after-luminescence.

Of course, many other changes and variations may be made by those skilled in the art in accordance with the principles set forth herein and in the claims annexed hereto.

What I claim is:

1. In the manufacture of luminous materials containing zinc sulphide, the steps which comprise providing a zinc sulphide base material free from nickel, and incorporating therewith compounds of silver and manganese, the amount of silver being at least several times that of manganese, the proportion of silver to manganese compounds in the base material lies between 6:1 and 10:1.

2. Zinc sulphide-containing luminous materials having a content of silver and manganese as activators in the proportion of silver to manganese compounds lies between 6:1 and 10:1.

3. Intensifying screens comprising luminous materials containing zinc sulphide and having a content of silver and manganese as activators in the proportion of silver to manganese compounds lies between 6:1 and 10:1.

JOSEF EINIG.